Sept. 9, 1952      G. O. SCHNEIDER      2,609,848
PORTABLE SAWING APPARATUS FOR PROSTRATE LOGS
Filed April 1, 1950      2 SHEETS—SHEET 1
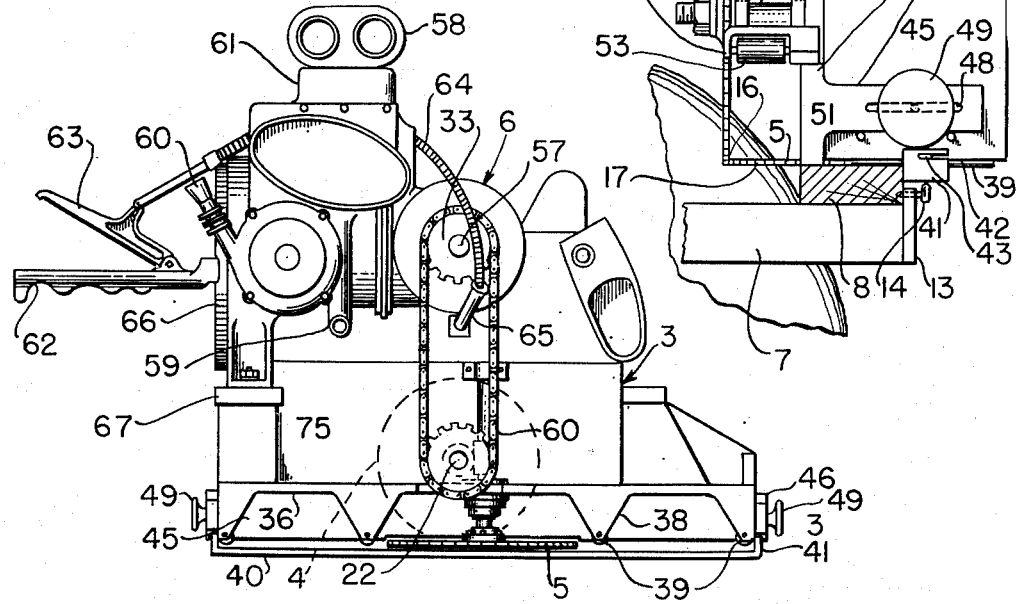
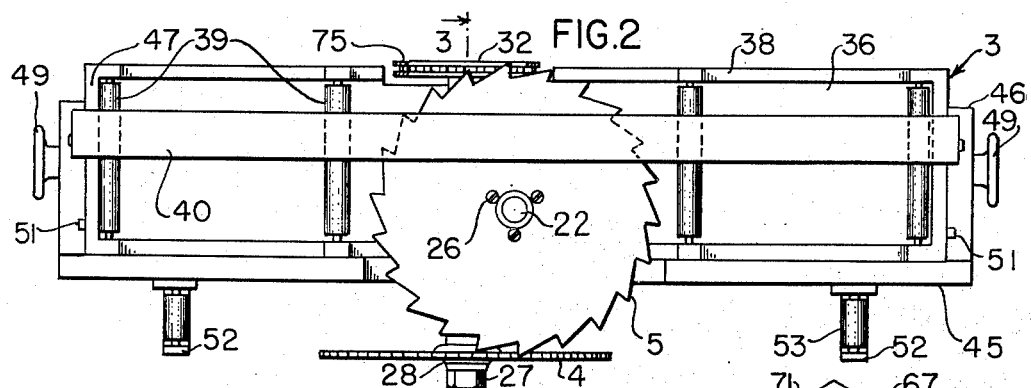
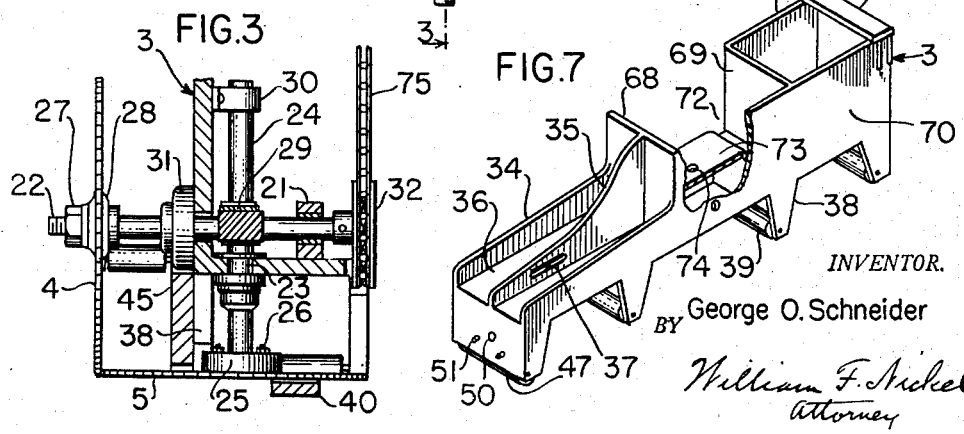
INVENTOR.
George O. Schneider
BY William F. Nickel
Attorney Sept. 9, 1952    G. O. SCHNEIDER    2,609,848
PORTABLE SAWING APPARATUS FOR PROSTRATE LOGS
Filed April 1, 1950    2 SHEETS—SHEET 2
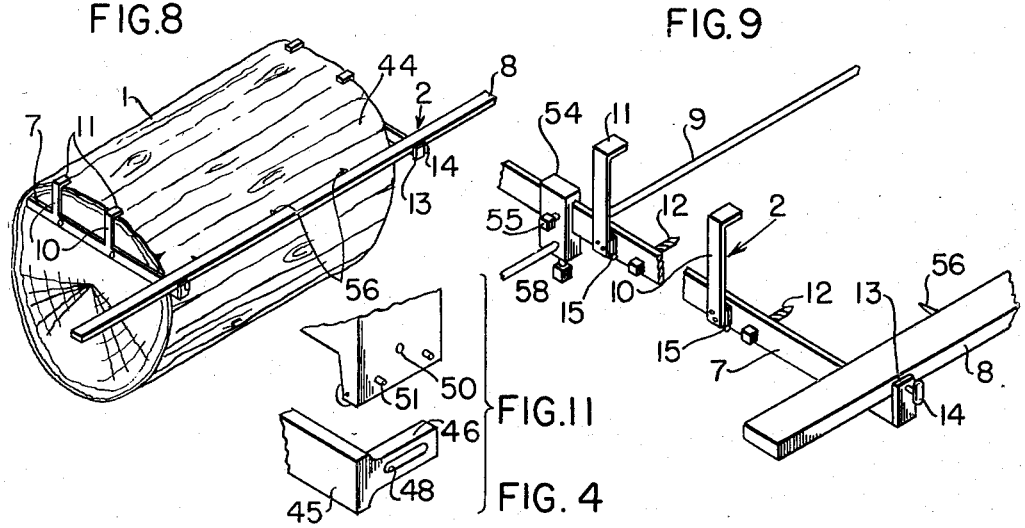
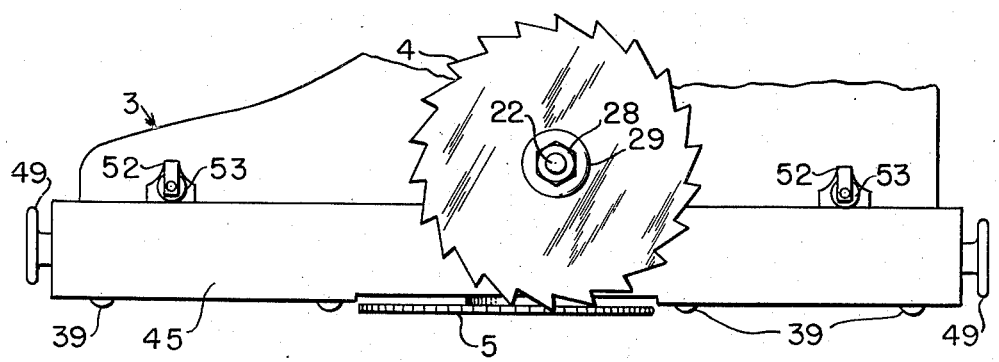
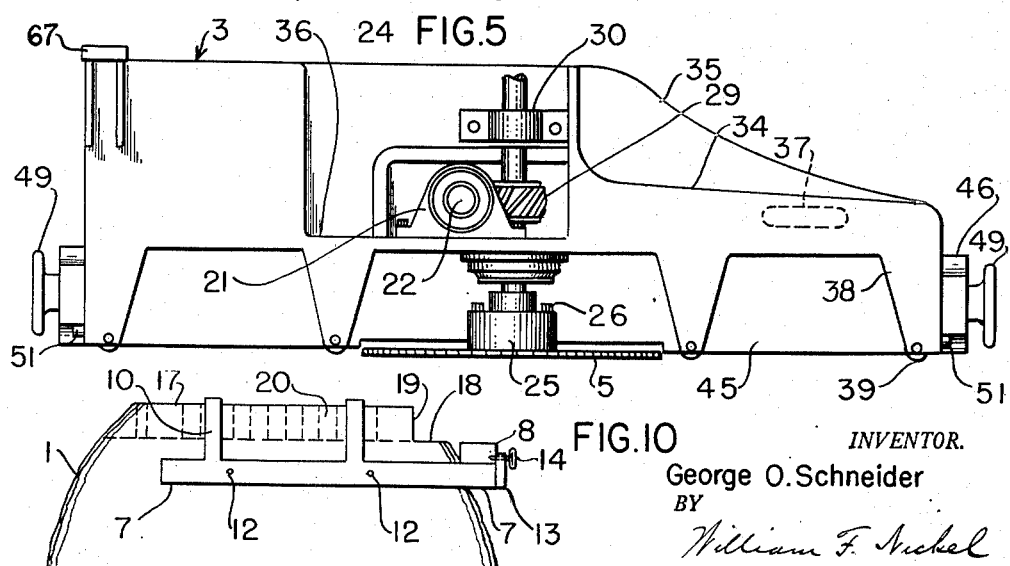
INVENTOR.
George O. Schneider
BY
William F. Nickel
Attorney Patented Sept. 9, 1952

2,609,848

UNITED STATES PATENT OFFICE 2,609,848

PORTABLE SAWING APPARATUS FOR PROSTRATE LOGS

George O. Schneider, San Francisco, Calif.

Application April 1, 1950, Serial No. 153,455

5 Claims. (Cl. 143—38)

My invention is an improvement in portable sawing apparatus; especially a sawing machine for use in dividing logs into lumber of the dimensions required, on the spot where a tree has been chopped down.

An important object of the invention is to provide a portable sawing apparatus which can be operated readily and effectively in the immediate locality where trees have been felled; so that the trunks thereof can be cut into pieces of lumber in all standard commercial sizes where they lie; and the pieces then easily carried out.

Another object is to provide a sawing machine having saw members or blades which are mounted to be actuated in different planes angularly related to each other and in such positions that an outside layer on a rough log can be expeditiously removed and the log afterwards sawed up into separate lengths which have the desired width and thickness.

A further object is to provide a sawing machine that is compact in size and comparatively light in weight, and of simple construction, so that it can be easily moved about and set up to work upon each log that is to be ripped apart. The heaviest timber can thus be successfully worked where the tree formerly stood, and no hauling out of the logs before sawing can be undertaken, is necessary.

In the lumber industry today, roads must first be built into the woods, so that the logs may be loaded upon trucks and hauled to a distant mill. During the process of conversion at the mill into lumber, about a fourth of the log is made useless because layers directly under the bark must be trimmed off at the outset. This of course is a total loss. But the mill owner must pay for transportation to the mill at a rate which figures in both the mileage covered and the original weight, with no allowance for waste. Added to this is the expense of unloading the logs into the cold deck or pound at the mill; also there are many small scattered timber tracts with trees of varying sizes and isolated tracts of big timber left by pioneers in valleys, dells and draws where the slopes are too steep for teams to pull the timber out. All such localities yield no timber at the present time because prohibitive costs forbid development.

The sawing apparatus of this invention is adapted to meet these conditions and will cut out pieces of lumber with straight parallel faces and edges from a round and tapered log on the ground. With this sawing machine two men can go into business at any of the above mentioned areas and compete with established mills on price. The owners of such machine take into the woods nothing but the apparatus, which is not bulky or cumbersome. The product brought out can be stacked in the lumber yards ready for sale and use.

In its preferred form the apparatus comprises a supporting framework that enables it to be mounted on top of a prostrate log, extending over the full length thereof; saw members that are disposed in the necessary positions to cut the log lengthwise into pieces of lumber, a body or carriage movably mounted so that it can be shifted along the framework from one end to the other and bearing said saws, a power unit such as a gasoline motor, on the body, and gearing connecting said unit to the saws to drive them. The framework not only serves to support the machine, but also serves to guide the body in its movement.

The nature of the invention and other objects and advantages thereof are fully and clearly stated in the ensuing description, and the novel features are defined in the appended claims. On the drawings some preferred embodiments of the apparatus are illustrated, but the forms shown are explanatory only and various alternations in structural details may be adopted in practice without deviation from the general plan containing the invention or omission of any of the essential characteristics.

In said drawings:

Figure 1 is a side view of one form of the complete apparatus.

Figure 2 is a bottom plan of the body or carriage for the working parts of the apparatus, somewhat different from what is shown on Figure 1.

Figure 3 is a section on line 3—3 of Figure 2.

Figure 4 is a front view of the carraige shown on Figure 2.

Figure 5 is a rear view thereof.

Figure 6 (sheet 1) is an end view in part.

Figure 7 shows on a reduced scale the shape of said carriage without the working parts of the machine, this carriage being somewhat different in detail from that shown in Figures 1, 2 and 3.

Figure 8 (sheet 2) is a perspective view of a framework for supporting the machine on a log.

Figure 9 is a view of another form of such a framework.

Figure 10 shows how the operation of sawing up the log is performed; and

Figure 11 is a detail of the apparatus.

The log to be transformed into lumber is indicated at 1 in Figures 8 and 10. This log is obtained by felling a tree and then sawing the trunk crosswise into as many sections of the right lengths as the height of the tree permits. An open framework 2 is then laid upon the log so as to be supported thereby at the sides and ends; the curved top of the log as it lies upon the ground being exposed above the framework. At the commencement of operations the body 3 of the machine is set on this framework and moved along the log; the framework comprising a track member on which the apparatus is mounted; but afterward and for most of the task of making the log into lumber this member is not needed. The log is of course actually longer than it appears on the Figure 8.

The carriage or body 3 has rotatably mounted thereon a saw member such as a blade or disk 4, which revolves in a vertical plane, separated from the carriage, and another saw member 5, of the same size which revolves in a horizontal plane and projects from the front of the carriage. The rims of the saws overlap, and the saws are set so that the teeth on one disk register with the spaces or indentations between the teeth on the rim of the other. Hence, as the carriage 3 is impelled lengthwise from one end of the log to the other, the saw disks make cuts in intersecting planes 90 degrees apart; and successive strips are thus cut from the log 1. The engine furnishing the power is indicated on top of the carriage at 6.

The framework 2 comprises two cross bars 7 (Figure 8) that are attached to the ends of the log: and on these bars rests a bar or plank 8 which forms a track for the saw carriage 3. This plank lies upon the ends of the bars at one side of the log and extends lengthwise thereof; and the opposite ends of the bars, as illustrated in Figure 9, can be adjustably secured to a bar or rod 9 which also extends along the length of the log parallel to the member 8 and makes the fourth side of the framework 2. This particular unit will be more fully described later. Each bar 7 has connected thereto a pair of upright arms 10, with overturned upper ends or hooks 11 by which the arms can be suspended from the curved top of the log 1; and each bar has threaded apertures in which are bolts or screws 12 with pointed ends that can be forced into the ends of the log to hold the frame fast in horizontal position and prevent tilting or sagging when the machine is placed thereon. The ends of the bars receiving the plank 8 have shoulders or stops 13 abutting the outer edge of the plank, and in these projections are screws 14 with pointed ends to be forced into the plank to prevent tilting and slipping or longitudinal movement thereof. Preferably the arms 10 are hinged to the bars 7, as indicated at 15.

When the machine is set upon the plank 8 and pushed along this plank as a track from one end of the log to the other, the saws cut successive strips, the first being like the strip 16 (Figure 6), from the top of the log; and the horizontal saw disk 4 always cuts at the same level. Therefore, when the disk 4 has worked through to the opposite side of the log above the member 9, the top of the log presents a flat surface 17, as illustrated in Figures 6 and 10. The framework is then lowered by causing the hooks 11 to engage the surface 17, and the apparatus is then operated to cut from the log another triangular strip which leaves a narrow, flat horizontal surface 18 parallel to the surface 17, and a narrow, flat vertical surface 19 at right angles to the surface 17 and 18, and intersecting the surface 17 to present a right-angled corner thereat. The machine can now be operated to cut strips from the log as wide as the surface 19, and of varying thickness between faces parallel to the surface 19, as indicated at 20 in Figure 10.

The carriage 3 of the machine is illustrated on Figure 1 with all moving parts thereon. This carriage may be of wood or metal, of suitable construction; and the preferred embodiment appears on Figures 2 to 6 inclusive. It has a bearing 21 for a horizontal shaft 22 to the end of which the vertical disk 4 is affixed; and a bearing opening 23 in the bottom of the carriage for a vertical shaft 24 to which the horizontal saw disk 5 is affixed. The disk 5 has a hub 25 secured to it by screws 26, and the hub is fixed to the shaft 24. The disk 4 is affixed to the shaft 22 by suitable means comprising a nut 27 and collars 28, one fast on said shaft 22. The two shafts are connected to revolve at the same speed by gearing 29. This gearing will be of any type suitable for the purpose and need not necessarily be as shown in Figures 3 and 5. The shafts are of course connected to be operated from the source of power or engine 6 on the carriage 3. Additional bearings, some of which are indicated at 30 and 31 on the carriage 3, for the shafts can, of course, be provided.

The transmission means between the engine and the saws comprises a gear 32 on the horizontal shaft 22, and a gear 33 on the shaft of the engine, with a chain connecting these gears, as illustrated in Figures 1, 2 and 3. Power could also be applied by coupling the shaft 24 at the top to a source of power, and omitting the sprocket and chain gearing.

The body 3 at one end has longitudinal ribs 34 along its sides, and a rib 35 between the ribs 34, all rising from a bottom 36. In the middle rib is a hand opening 37 (Figures 5 and 7) adjacent one end to be used by the operator. To the bottom are affixed legs 38, along each side, with bearing openings for the trunnions of rollers 39. These rollers are of some length and are partly covered on the lower sides by a narrow guard 40. This guard has upturned ends 41 with horizontal slots 42 (Figure 6) in their outer edges. The ends of the carriage have fixed stops or studs 43 which project through the slots, and when the studs abut the inner ends of these slots, the guard will be in position to engage the edge of the plank 8. Enough of the rollers 39 will then rest on the plank 8 to enable the machine to make the first cut to start the formation of the flat surface 17. When the first of the strips is taken off the top of the log 1, the guard is removed from the carriage so that the front parts of the rollers 39 can rest on the surface 17; and the cutting is continued till the whole top layer 44 under the bark has been cut away. The framework is then attached with the hooks 11 on the surface 17, as stated above; a triangular strip is cut from the side of the log below the surface 17 to begin a new flat surface 18 parallel to the surface 17 and the making of lumber of varying thicknesses then proceeds. See Figure 10.

The front of the carriage 3 behind the saw disk 4 has a longitudinal gauge bar 45, with transverse arms 46 at the ends. See Figures 1, 5 and 11. These arms overlap the ends 47 of the body 3, and the distance of this bar from the plane of the vertical saw disk 4 determines the thickness of each piece of lumber. The arms 46 flanking the ends 47 of the carriage each has a slot 48 to receive a knob screw 49 which enters a hole 50 in the adjacent end 47. The lower edge of the arms rests on studs 51 projecting from the ends of the carriage. Hence the gauge bar can be set 1, 2, 3 or 4 inches from the saw disk 4 and held fast by the screws 49, and the lumber will be 1 inch, 2 inches, 3 inches, or 4 inches thick depending on the adjustment.

The gauge bar also has brackets 52 (Figure 2) attached to its front face, and these brackets bear rollers 53. With the rollers 39 on the surface 18, the rollers 53 will be on the surface 17, so that the carriage will be kept level and prevented from tilting inward.

The operation may be understood by inspection of Figures 8 and 10, presenting the framework 2 without the bar 9. It is best, however, to have the framework with a bar 9 to form the fourth side, this bar being adjustably attached to the cross bars 7 by couplings 54 that have bearing openings for the ends of the bar and for cross bars 7. Binding screws 55 in the couplings 54 hold the bars 7 and 9 in adjusted position, so that the frame can be made longer or wider. The screws 12 will then hold in the ends of the log, even when the hooks 11 are turned down so as to be out of the way of the horizontal saw disk 5.

To use the machine, the carriage is lifted upon the framework 2, and the guard 40 is pushed against the outer edge of the member 8. The rollers 39 in front of the guard rest on the top of the member 8, which is pushed against the side of the log near the top and held against tilting by the screws 14. At this time the framework 2 has the general position shown in Figure 8. The bars 7 and arms 10 hang from the hooks 11 on the ends of the log, and the pointed screws 12 will pierce said ends so that the frame cannot be tilted crosswise, or sag on the side with the plank 8. This result is easily obtained with the framework 2 shown on Figure 9, which has the bar 9 on the opposite side of the log 1. When the screws 55 are tightened in the couplings 54, and the screws 14 in the projections 13 are forced into the edge of the plank 8, the bars 7 are secured against the ends of the log and the screws 12 can be forced into ends as far as necessary. The inner edge of the plank 8 may have spikes 56 to be forced into the log when the screws 13 are tightened to prevent the plank from tilting crosswise.

The carriage is now rolled along the track 8 from end to end of the log with the saws revolving, and a long triangular strip 16 is cut out of the log as illustrated in Figure 6. The carriage is then moved back to its starting point and the guard 40 under the body 3 taken off, so that the rollers 39 make contact partly with the plank and partly with the narrow flat horizontal surface 17 left in the log when the strip 16 is removed. Another strip is thus ripped off making the surface 17 wider. This operation is repeated till the log presents a wide flat surface 17 on its top. The arms 10 are hinged to the bars 9 and are swung down to be out of the way of the saw members as soon as the framework is secured upon the log 1.

The framework is now lowered by suspending it on the hooks 11 from the flat surface 17 on the top of the log. See Figure 10. The back bar 9 is moved outward to increase the width of the framework to the extent required, the couplings 54 are again tightened, and the screws 14 and 12 turned in once more against the plank 8 and log 1. The saw carriage is put on the plank 8 as before, with the guard 40 replaced, and another strip, triangular in cross section is ripped from the log. This leaves the flat horizontal surface 18 at the side of the log reaching in to the vertical surface 19. The guard 40 is now taken off, and the rollers 39 make contact with the plank 8 and the surface 18. A piece of lumber can then be produced that is as wide as the surface 19 and as thick as the distance between the vertical saw 4 and the guard plate 45. If the height of the surface 19 is 4 inches for example, the width of this piece can be 4 inches and the thickness 1, 2, 3, or 4 inches, depending on the adjustment of the gauge bar 45. The rollers 39 rest on the surface 18, to prevent the carriage from tilting forward; and cut after cut can be made to produce lumber 4 inches wide and of the degrees of thickness mentioned above. After the surface 18 has been extended over the full width of the log, the framework is again lowered and fastened, and the operation continued.

When the log has been cut down to the middle, it can be turned over if necessary to bring the round bottom uppermost and raised at its ends. This half of the log is then cut up in the same way.

The carriage 3 may have any suitable construction and the motor to operate the saw disks can have any selected position. In Figure 1 the motor is shown as a gasoline engine 6 operating the drive shaft 57 carrying the gear 33. The engine also has an air filter 58, exhaust 59, and a handle 60 to start the motor by a pull-out action, as upon outboard motors. The fuel tank is indicated at 61. On the framework of the engine at the end of the carriage remote from the ribs 34 and 35 is a handle 62 bearing a pivoted lever 63. A flexible cable 64 is attached to this arm and passes through a sleeve bearing 65 to the engine clutch (not shown). The engine also has a cooling fan in an opening the rim of which is indicated at 66. On top of the carriage at one end adjacent the handle 62 is a cross plate 67 to which the engine is bolted. The body of the engine rests on the top of the carriage and is large enough to extend over a considerable part of the length thereof towards the opposite end. Preferably two handles like the handle 62 are attached side by side to the body of the engine, and the additional handle will carry the accelerator or throttle lever connected to the carburetor (not shown) for controlling the fuel. When the machine is in use it is held by the rib 35 at one end and the handles at the other, so as to keep the guard 40 in full contact with the plank 8, and the gauge bar in full contact with a vertical surface on the log, such as the narrow surface 19.

The invention of this application resides in the saw members, the way of operating them, and the framework by which the carriage is supported on a log to move along the latter. The type of engine or motor employed and the arrangement of the accessories can be varied over a wide range.

The carriage 3 can also be altered in its construction and the configuration illustrated in Figure 7 may be taken as an example. This embodiment has a cross web or rib 68, joining the ends of the ribs 34 and 35 and between this web or partition 68 and the end remote from said ribs is a similar web 69. One of the ribs 34 is extended across both webs 68 and 69 along the side to the other end of the carriage, as shown at 70, and at the opposite side is a web 71 between the web 68 and the adjacent end. Between the webs 68 and 69 is a bay or recess 72 above the bottom to receive the shafts and connecting gears. In the bay 72 is a housing 73 containing the gearing 29, to be filled with lubricating grease. The shafts project from the casing 73 through holes 74.

The distance between the saw 5 and the shaft of the saw 4, and the length of the bars 7 can be such as to cut timbers of 4 inch, 6 inch or other widths. After the surface 17 or 18 is made wide enough the framework 2 can be removed entirely, as the carriage 3 will then rest with its rollers 39 thereon. In such a case the bars 7 do not have to be hinged, but with the bars 7 hinged as in Figure 9, the framework 2 can remain on the log as the sawing proceeds. The chain is indicated in Figures 1, 2 and 3 at 75.

Having described my invention, what I believe to be new is:

1. Apparatus for cutting prostrate logs comprising an open frame having a longitudinal bar at each side and crossbars connecting said longitudinal bars, said crossbars having means for engaging the ends of a log when the frame is in position thereon, the longitudinal bars then extending along the log and the top of said log projecting through said frame, a carriage supported on one of said longitudinal bars to be moved along said frame, a disk at the bottom of said carriage and parallel to the plane of the frame, said disk projecting from the side of the carriage that faces inward of the frame, a disk at the same side of the carriage spaced therefrom and perpendicular to the first disk, the rims of said disks bearing saw teeth, the rims meeting at one point, the teeth on one rim registering with the spaces between the teeth of the other, shafts bearing said disks, means on the carriage for rotating said shafts and disks, and a longitudinal gauge bar mounted on the inward side of said carriage adjacent the bottom to abut the log, said gauge bar having means for connecting it to the carriage to provide for the bar to be adjusted laterally towards and from the carriage to determine the thickness of a strip of timber to be cut by the teeth on said disks, the maximum width of said strip being determined by the distance between the first-named disk and the disk-clamping means at the center of the other disk.

2. Apparatus for cutting prostrate logs comprising an open frame having a longitudinal bar at each side and crossbars connecting said longitudinal bars, said crossbars having means for engaging the ends of a log when the frame is in position thereon, the longitudinal bars then extending along the log and the top of said log projecting through said frame, a carriage supported on one of said longitudinal bars to be moved along said frame, a disk at the bottom of said carriage and parallel to the plane of the frame, said disk projecting from the side of the carriage that faces inward of the frame, a disk at the same side of the carriage spaced therefrom and perpendicular to the first disk, the rims of said disks bearing saw teeth, the rims meeting at one point, the teeth on one rim registering with the spaces between the teeth of the other, shafts bearing said disks, means on the carriage for rotating said shafts and disks, and a longitudinal gauge bar mounted on the inward side of said carriage adjacent the bottom to abut the log, said gauge bar having means for connecting it to the carriage to provide for the bar to be adjusted laterally towards and from the carriage to determine the thickness of a strip of timber to be cut by the teeth on said disks, the maximum width of said strip being determined by the distance between the first-named disk and the disk-clamping means at the center of the other disk, said gauge bar having brackets projecting from its front face, and rollers on the brackets to engage the log and prevent inward tilting of the carriage.

3. Apparatus for cutting prostrate logs comprising an open frame having a longitudinal bar at each side and crossbars connecting said longitudinal bars, said crossbars having means for engaging the ends of a log when the frame is in position thereon, the longitudinal bars then extending along the log and the top of said log projecting through said frame, a carriage supported on one of said longitudinal bars to be moved along said frame, a disk at the bottom of said carriage and parallel to the plane of the frame, said disk projecting from the side of the carriage that faces inward of the frame, a disk at the same side of the carriage spaced therefrom and perpendicular to the first disk, the rims of said disks bearing saw teeth, the rims meeting at one point, the teeth on one rim registering with the spaces between the teeth of the other, shafts bearing said disks, means on the carriage for rotating said shafts and disks, and a longitudinal gauge bar mounted on the inward side of said carriage adjacent the bottom to abut the log, said gauge bar having means for connecting it to the carriage to provide for the bar to be adjusted laterally towards and from the carriage, to determine the thickness of a strip of timber to be cut by the teeth on said disks, the maximum width of said strip being determined by the distance between the first-named disk and the disk-clamping means at the center of the other disk, the gauge bar having transverse ends with slots therein adjacent the ends of the carriage, the connecting means comprising binding screws in said slots and attached to said carriage.

4. Apparatus for cutting prostrate logs comprising an open frame having a longitudinal bar at each side and crossbars connecting said longitudinal bars, said crossbars having means for engaging the ends of a log when the frame is in position thereon, the longitudinal bars then extending along the log and the top of said log projecting through said frame, a carriage supported on one of said longitudinal bars to be moved along said frame, a disk at the bottom of said carriage and parallel to the plane of the frame, said disk projecting from the side of the carriage that faces inward of the frame, a disk at the same side of the carriage spaced therefrom and perpendicular to the first disk, the rims of said disks bearing saw teeth, the rims meeting at one point, the teeth on one rim registering with the spaces between the teeth of the other, shafts bearing said disks, means on the carriage for rotating said shafts and disks, and a longitudinal gauge bar mounted on the inward side of said carriage adjacent the bottom to abut the log, said gauge bar having means for connecting it to the carriage to provide for the bar to be adjusted laterally towards and from the carriage, to determine the thickness of a strip of timber to be cut by the teeth on said disks, the maximum width of said strip being determined by the distance between the first-named disk and the disk-clamping means at the center of the other disk, the engaging means of the crossbars comprising hanger hooks to engage the top of the log and pointed screws to pierce the ends thereof.

5. Apparatus for cutting prostrate logs comprising an open frame having a longitudinal bar at each side and crossbars connecting said longitudinal bars, said crossbars having means for engaging the ends of a log when the frame is in position thereon, the longitudinal bars then extending along the log and the top of said log projecting through said frame, a carriage supported on one of said longitudinal bars to be moved along said frame, a disk at the bottom of said carriage and parallel to the plane of the frame, said disk projecting from the side of the carriage that faces inward of the frame, a disk at the same side of the carriage spaced therefrom and perpendicular to the first disk, the rims of said disks bearing saw teeth, the rims meeting at one point, the teeth on one rim registering with the spaces between the teeth of the other, shafts bearing said disks, means on the carriage for rotating said shafts and disks, and a longitudinal gauge bar mounted on the inward side of said carriage adjacent the bottom to abut the log, said gauge bar having means for connecting it to the carriage to provide for the bar to be adjusted laterally towards and from the carriage, to determine the thickness of a strip of timber to be cut by the teeth on said disks, the maximum width of said strip being determined by the distance between the first-named disk and the disk-clamping means at the center of the other disk, one end of each crossbar having a stop to retain the last-named longitudinal bar, the opposite end of said crossbars having coupling members for slidably connecting them with the opposite longitudinal bar.

GEORGE O. SCHNEIDER.

REFERENCES CITED

The following references are of record in the file of this patent:

UNITED STATES PATENTS

| Number | Name | Date |
|---|---|---|
| 13,305 | Fulghum | July 24, 1855 |
| 683,590 | Brower | Oct. 1, 1901 |
| 694,757 | Larsson | Mar. 4, 1902 |
| 757,626 | Kottmann | Apr. 19, 1904 |
| 787,532 | McCreery | Apr. 18, 1905 |
| 1,170,454 | Magerkurth | Feb. 1, 1916 |
| 1,174,890 | Naylor | Mar. 7, 1916 |
| 1,543,165 | Kessler | June 23, 1925 |
| 2,051,256 | Hilke | Aug. 18, 1936 |
| 2,344,426 | Stamm | Mar. 14, 1944 |

FOREIGN PATENTS

| Number | Country | Date |
|---|---|---|
| 230,094 | Germany | Jan. 14, 1911 |
| 18,886 | Australia | Mar. 13, 1929 |